United States Patent [19]
Donkin

[11] 3,736,501
[45] May 29, 1973

[54] ROTATABLE TEST DEVICE HAVING DIAMETRICALLY OPPOSED SENSORS AND COUNTERWEIGHTS INTERLINKED FOR RADIAL MOVEMENT BY CENTRIFUGAL FORCE

[75] Inventor: Thomas R. Donkin, Chelsea, Mich.

[73] Assignee: Automation Industries, Inc., Century City, Calif.

[22] Filed: Mar. 25, 1971

[21] Appl. No.: 128,174

Related U.S. Application Data

[63] Continuation of Ser. No. 840,437, July 9, 1969, abandoned.

[52] U.S. Cl. ................................................. 324/37
[51] Int. Cl. .............................................. G01r 33/12
[58] Field of Search ................................ 324/37, 40

[56] References Cited

UNITED STATES PATENTS 2,878,447  3/1959  Price et al. ........................... 324/37
3,281,667  10/1966 Doblins et al. ........................ 324/40
3,336,527  8/1967  Paulson et al. ........................ 324/40

Primary Examiner—Robert J. Corcoran
Attorney—Dan R. Sadler

[57] ABSTRACT

A material tester is described in the embodiments set forth herein which is adapted to rotate pickup probes about a workpiece such as a continuous wire or rod. Weights are spatially connected to pickup probes and are biased towards the workpiece. The weights and probes are pivotally mounted to one another and are carried by a rotatable housing. Guide shafts are attached to the weights and probes and are slidable in mating openings within the rotatably housing. The guide shafts are disposed within the rotating housing normal to the centerline of the axis of rotation of the housing where the workpiece is disposed. By rotation the weights move away from the center of rotation and overcome the biasing thereon. This moves the probes towards the workpiece. A cam included in the described embodiments is used to adjust the movement of the weights and probes in order to inspect various sizes of workpieces.

6 Claims, 5 Drawing Figures

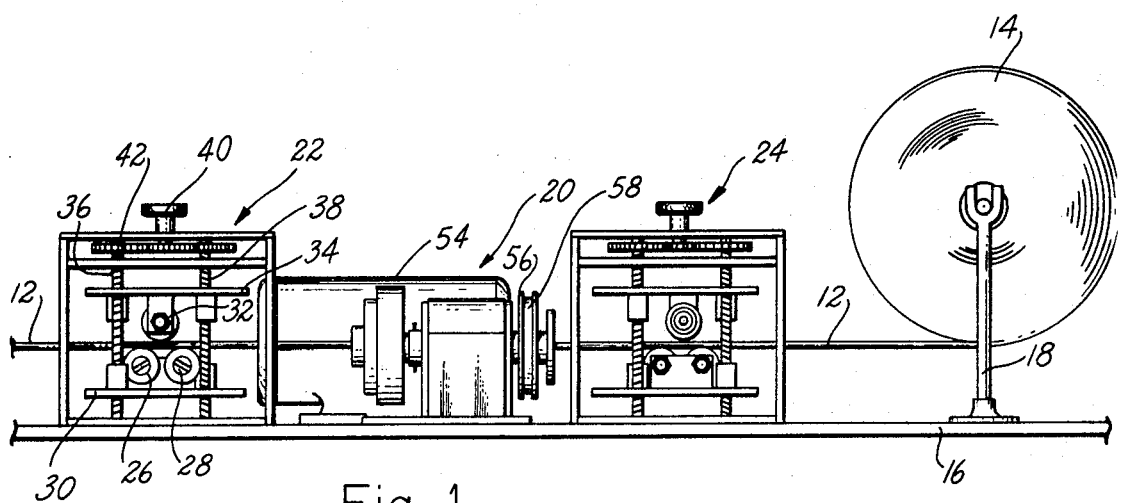
Fig. 1.
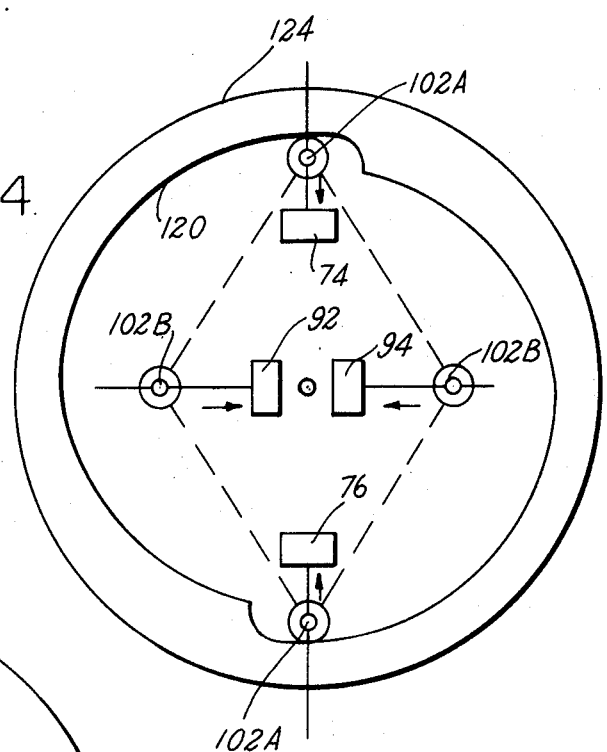
Fig. 4.
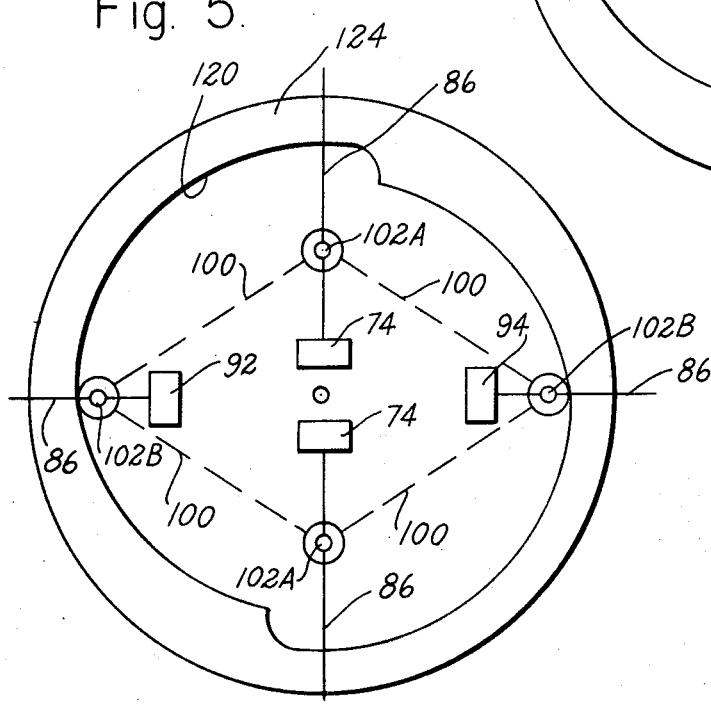
Fig. 5.
THOMAS R. DONKIN,
INVENTOR.
ATTORNEY

THOMAS R. DONKIN,
INVENTOR.

PATENTED MAY 29 1973
3,736,501
SHEET 3 OF 3
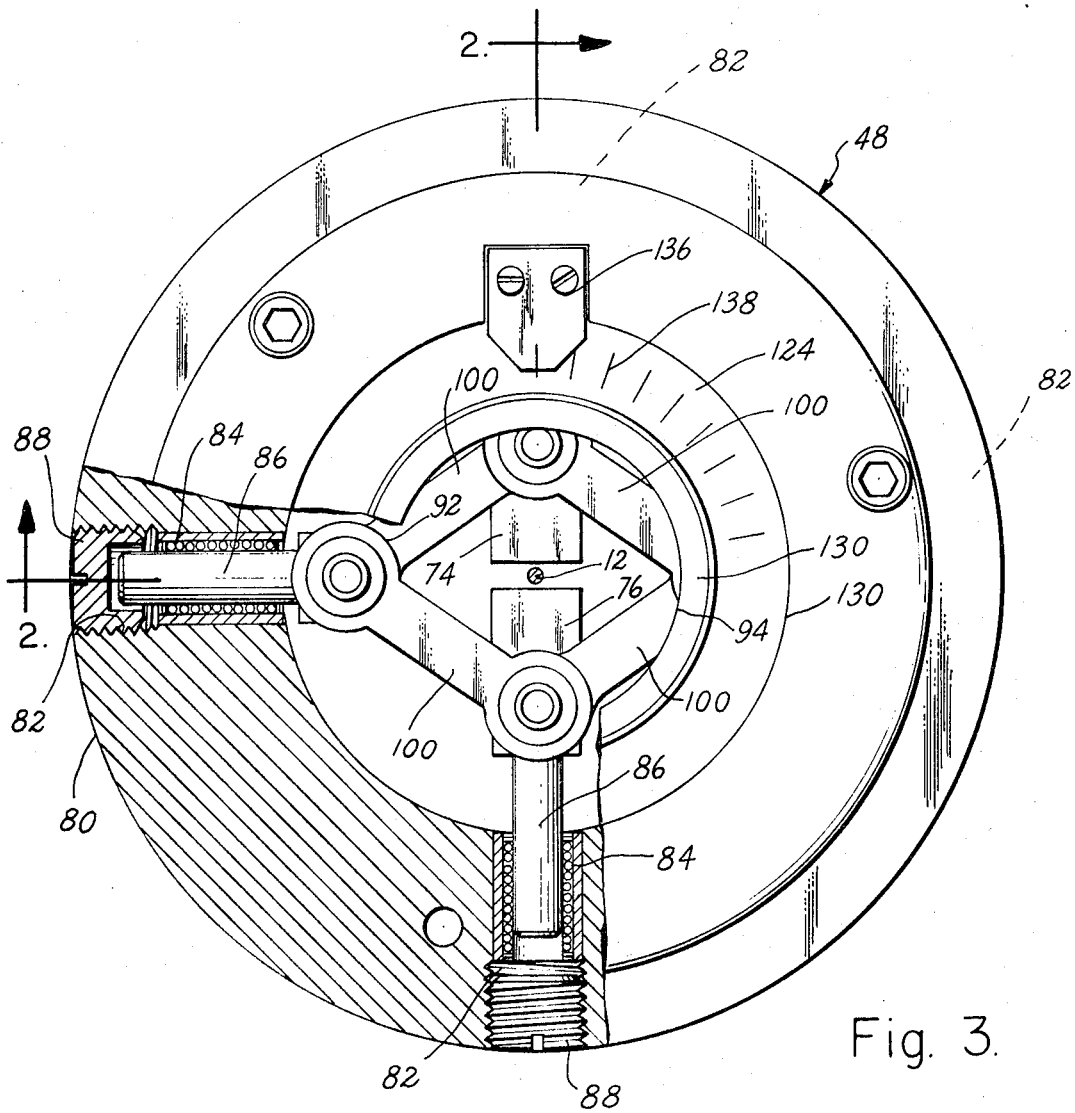
Fig. 3.
THOMAS R. DONKIN,
INVENTOR.
ATTORNEY

ROTATABLE TEST DEVICE HAVING DIAMETRICALLY OPPOSED SENSORS AND COUNTERWEIGHTS INTERLINKED FOR RADIAL MOVEMENT BY CENTRIFUGAL FORCE

This is a continuation of co-pending application Ser. No. 840,437 filed July 9, 1969, now abandoned for Material Tester on behalf of THOMAS R. DONKIN.

BACKGROUND OF THE INVENTION

1. Field of the Invention

This invention relates to apparatus for detecting flaws, defects or other discontinuities in a cylindrical metallic wire, rod, or the like. More particularly, this invention is concerned with a novel and improved apparatus for rotating sensing probes about the wire to sense the strength and irregularities of magnetic field interaction with the wire which may then be interpreted in terms of a structural integrity or composition of the wire.

2. Discussion of the Prior Art

Rotating probes for detecting flaws or defects in wire or other material such as rods and the like have heretofore been used commercially. Generally, probes of this type possess a sensing head which is rotated about the wire to test for flaws therein. The magnetic field of the wire is established by suitable means such as induction from a coil which surrounds the wire just before the coils, or a current passing through the wire, or by means of eddy currents induced by the probes themselves. The wire is then advanced through the induction coil, if employed, and adjacent the probes. The resulting field sensed by the probe is then transmitted to a suitable indicating instrumentation and the signal current is thereafter interpreted in terms of the presence or absence of flaws or other characteristics of the wire. Any flaw, defect or irregularity in the structural integrity or composition causes a change in the field sensed by the probe, which in turn is sensed by the instrumentation. It is important that the spacing of the sensing probe or probes, as the case may be, from the surface of the wire be accurately maintained at a given, constant distance, since field strength will also vary according to the spacing between the sensing probe and the workpiece.

The invention hereinafter to be described is directed to an improved probe mounting means for use in flaw detection and for maintaining the probes either at a predetermined spacing about or directly upon the periphery surface of the wire. The invention provides mounting and rotating apparatus which allows the probe to assume the desired distance from the wire by centrifugal force and yet remain in a constant balance in its acceleration. With the surface contact option, the probes possess resilient freedom in a plane of rotation about the wire. This freedom allows the probe to follow variations in the peripheral concentricity of the wire with the center of rotation as it passes coaxially through the device. Otherwise, a constant spatial relationship between the sensing elements of the probe and the wire surfaces is maintained with resulting improved accuracy of the flaw detection system as a whole.

SUMMARY

Briefly described, a material tester is described which includes a rotatable mounting means including a housing which is adapted to be rotated about a center axis thereof. The mounting means has an aperture or center bore through the center axis which the workpiece is capable of being advanced. At least one sensing or search head is carried by the mounting means for movement in a direction normal to the center axis of the mounting means and consequently to the workpiece. A counterweight is provided and is pivotally coupled to the sensing head and carried by the mounting means to move normal to the center axis of the mounting means. A bias in the form of a spring, in one example, urges the counterweight towards the center axis and consequently the probes away.

As the mounting means is rotated about its center axis the counterweights are forced outwardly by the centrifugal force of the rotation and overcome the bias. The probes being lighter in weight than the counterweight, move inwardly towards the center axis and the workpiece. Constant rotation of the scanning mechanism maintains the distance between the probe and the workpiece constant.

An adjustment may be provided in one embodiment which limits the outward movement of the weights. Thus by proper adjustment of the outward movement of the weights, which adjustment regulates the inward movement of the probes, differing diameter workpieces may be tested and inspected.

With the use of a pair of facing weights and a pair of facing probes (or a single probe and a dummy probe) evenly spaced about the center axis, complete balance can be obtained. In operation, means are provided to induce electrical energy into the workpiece, which is in turn sensed by the pickup probes. Instrumentation is provided which indicates any changes in the eddy currents or leakage fluxes sensed by the pickup probes due to irregularities in the workpiece. During the rotation of the probes, the workpiece may be advanced through the aperture therein. The effect thereof is helical type scan about the periphery of the workpiece. In order to obtain the maximum amount of scan in a given area, it is desirable to rotate the probes at a relatively fast rate. Thus, the probe is moved into close proximity to the wire when rotation of the scanner attains the speed of predetermined revolutions per minute. The workpiece is mounted to move through the bore of the entire scanner.

A feature of this invention is that the gap that remains between the energized surface probe housing and the wire is determined by the setting of an adjustment stop cam wherein one division of a dial shown therein represents a certain predetermined liftoff variation or spacing between probe and workpiece. A further feature of this invention is that means and apparatus are provided in this invention whereby the probe coil focus is always normal to the center axis of the workpiece during the rotation and consequently the sensitivity does not change when workpieces of various sizes are interchanged.

DESCRIPTION OF THE DRAWINGS

These and other features and advantages will become more apparent to those skilled in the art when taken into consideration with the following detailed description wherein like reference numerals indicate like and corresponding parts throughout the several views and wherein:

FIG. 1 is a side view of the material tester of this invention mounted on its operation standard;

FIG. 3 is a front view of the scanning and transformer mechanism in FIG. 2 and illustrating broken-away sections; and FIGS. 4 and 5 are partially schematic views illustrating the positions of the sensing heads in stopped and rotating positions.

DETAILED DESCRIPTION OF THE DRAWINGS

Figure 2:
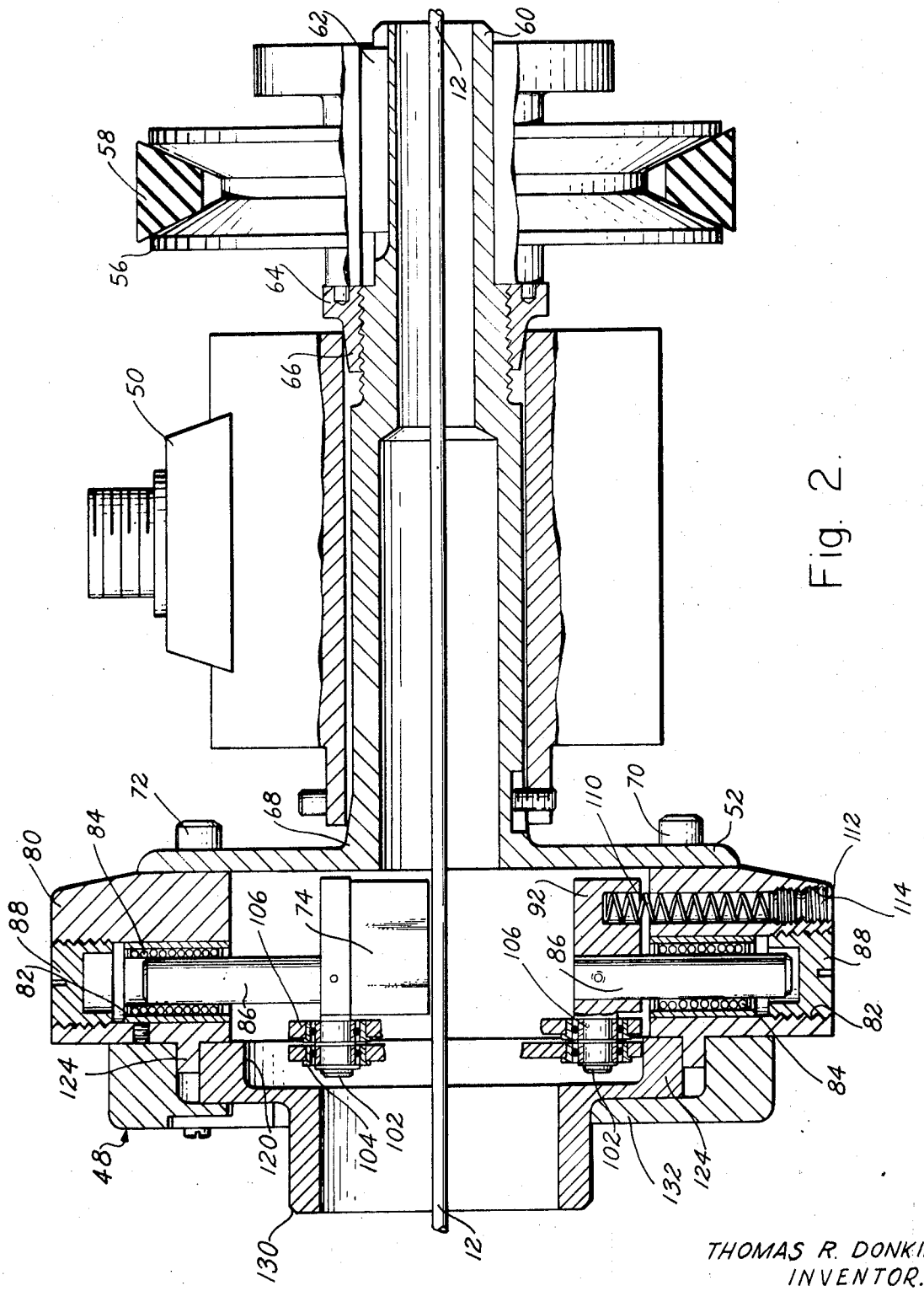
FIG. 2 is a section view of a scanning and transformer mechanism used in this invention.

Turning now to FIG. 1 there is shown the apparatus of this invention for testing, for example, a wire 12 which may be provided from a supply which is coiled on a reel 14 which is rotatably connected to a base member 16 by the standard 18. A sensing mechanism 20 is used to inspect the wire for defects or other discontinuities therein.

Apparatus is provided to assure the wire is continuously horizontal and parallel to the scanning mechanism 20. This apparatus comprises a clamp 22 on one end of the wire as it proceeds from the scanning mechanism 20 and a clamping arrangement 24 which assures the wire is taut and fed straight into the inspecting mechanism 20.

To implement the apparatus for holding the wires, a pair of rollers 26 and 28 are rotatably mounted to a plate 30, and a single roller 32 is mounted to a plate 34. The plates 30 and 34 are adapted to be advanced or retracted from one another by being threadably mounted to a pair of threaded shafts 36 and 38. A knob 40 is geared to both shafts 36 and 38 by gears 42. By turning the knob 40 the plates 30 and 34 are advanced or retracted from one another depending upon the direction turned. The plates 30 and 34 then position the guide rollers 26 and 28 and 32 with respect to the wire 12 to assure that some tension is placed thereon and that the wire is centered into the test apparatus.

The wire holder 24 is similar to holder 22 and therefore its structure and operation will not be described herein.

Referring now to FIG. 2, there is shown a section view of the scanning mechanism 20 which includes a transformer 50 adapted to induce electromagnetic energy into the wire 12. The material tester is mounted to a plate 52 which rotates with the transformer 50. The transformer 50 is caused to rotate by the motor 54 as shown in FIG. 1. The motor is connected to the rotating transformer 50 and scanner 20 by the pulley 56 and the drive belt 58. The pulley 56 is firmly affixed to a hollow shaft 60 and secured in place by a key stock 62. The pulley 56 is connected to a collar 64 which is threaded on to the hollow shaft 60. The collar 64 has a wedge 66 thereon, which is forced beneath the rotary transformer 50. The other end of the rotary transformer is forced against a wedge collar 68 on the shaft 60 near the rotary scanner 48. The shaft 60 is hollow to enable the wire 12 to pass therethrough from the reel 14. While this embodiment shows the use of transformers for inducing electrical energy to the workpiece, it is also possible that slip rings or the like may be replaced therefor.

The rotary scanner 48 is affixed to the plate 52 which in turn is coupled to the hollow shaft 60. The scanner 48 is affixed to the plate 52 by the bolts 70 and 72. The scanner 48 comprises a pair of pickup probes or search heads 74 and 76. The pickup probes are designed to scan the wire 12 as the rotary scanner 48 rotates thereabout.

Referring to the scanner 48 directly, reference is now made to FIGS. 2 and 3 collectively. The scanner includes a housing 80 with 90° circumferentially spaced openings 82 which are drilled therein normal to the center axis of the housing 80. Each of these openings 82 has a bearing 84 therein, and positioned within these bearings 84 are shafts 86. Thus, the shafts are slidable within the radial openings 82 and their bearings 84 to move normal to the center axis of the scanner 48, and more particularly normal to the center axis of the wire 12 which is under test. Suitable plugs 88 are positioned at the top of each opening 82 to seal off the holes wherein after the shafts 86 are positioned in the bearings 84, they can no longer slide out. An indentation may be provided in the plugs 88 in order to provide more freedom of movement of the shafts 86. In order to inspect the wire 12, the probes 76 and 74 are supported on the end of the shafts 86 and are adapted to move in the normal path of the shafts 86. The details and structures of the probes 74 and 76 are well known to those skilled in the art, and no attempt will be made herein to explain their construction, structure or function.

The probes 76 and 74 are carried by a first pair of diametrically opposed shafts 86. A second pair of shafts 86 slidably disposed in diametrically opposed openings 82 may have weights 92 and 94 connected thereto. The exact positioning of the probes 74 and 76 and the weights 92 and 94 are best shown in the schematized drawings shown in FIGS. 4 and 5.

The weights 92 and 94 and probes 74 and 76 are mechanically coupled together by linkage means comprising a plurality of links 100, best shown in FIG. 3. The links 100 are connected to pivots 102 carried by the shafts 86. The pivots may include bearings 104 therein to provide ease in the movement thereof. A second bearing 106 is provided and each shaft 86 carrying a pivot 102 is provided with its own bearing 104 or 106. Biasing means is provided by the spring 110 which forces the weights inwardly towards the center axis of the wire 12. The spring is positioned within a bore 112, which is drilled through the center of the scanner housing 80 and into the counterweight 92. A set screw 114 is threaded into the end of the bore 112 to hold the spring 110 in place. The function of the spring 110 is to force the counterweights 92 and 94 inwardly towards the center of the rotary scanner 48, as shown in FIG. 4. In this position the rotary scanner is static, i.e. not being rotated by the motor 54. It should be noted that the pivot points 102a as shown in FIG. 4 are outwardly extended and are each forced against a cam stop surface 120 of a cam 124.

With reference to FIG. 5, the position of the pivots 102b which are attached to the weights 92 and 94 are forced outwardly against the cam surface 120 of the cam 124. This is the position that the probes 74 and 76 and the weights 92 and 94 will assume when the rotary scanner 48 is rotating about its center axis. During this rotation, the probes 74 and 76 being much lighter than the weights 92 and 94, are forced inwardly by the fact that the weights 92 and 94 are forced outwardly by the centrifugal force of the rotation of the scanner 48. In turn, the probes 74 and 76 are moved inwardly towards the wire 12.

Adjustments in the limiting outward position allowable to the pivot points 102a and 102b which act as cam followers are determined by the position of the cam 124. The cam 124 is rotatable relative to the housing of the scanner 48 by manipulation of a dial handle 130. The cam 124 may be releasably securely clamped to the cam housing 80 in a manner to retain the cam 124 in its position. This is accomplished by a clamp 132 being securely coupled to the housing 80. If the clamp 132 is loosened, then the cam knob 130 can be rotated to adjust the positions of the pivots 102a and 102b, when they are positioned in an extended thrust. An indicator 136 may be positioned and secured to the clamp 132 and the cam 124 may have indicia 138 marked thereon so that the relative position of the cam 124 can be visualized. Thus, different diameter wires, rods or other cylindrical-shaped workpieces can be scanned by the probes 74 and 76 without actually coming in contact with the workpiece.

It will be understood that the links 100 pivotally interconnect adjacent support means, i.e., the shafts 86 and their respective radial openings 82, for the probes and counterweights. Each probe is pivotally connected to the adjacent counterweights through a pair of links and are thus in a predetermined position relative to one another throughout operation of the scanner. Consequently, the system remains dynamically balanced and the desired positioning of the probes relative to the workpiece and each other is maintained.

Having thus described one preferred embodiment of this invention, what is claimed is:

1. A nondestructive test system for testing an elongated workpiece comprising:
   a rotatable housing having a center axis and a center bore through which an elongated workpiece may be passed, said housing having four radial bores positioned about said axis to form two pair of diametrically opposed openings,
   a first pair of diametrically opposed support means carried by said housing in a pair of said openings and linearly movable toward and away from one another along a radial path;
   a second pair of diametrically opposed support means carried by said housing in said other pair of said openings and linearly movable toward and away from one another along a radial path angularly spaced from said first radial path;
   a search head carried by each of said support means of said first pair;
   a counterweight carried by each of said support means of said second pair;
   linkage means pivotally connecting each support means to both adjacent support means so as to maintain said search heads in a predetermined position relative to one another; and
   means biasing said counterweights toward one another to normally maintain said counterweights in their inner position when said housing is static and permitting centrifugal force to overcome said biasing means when said housing is rotated so as to move the counterweights radially outwardly thereby equally moving the search heads radially inwardly toward said workpiece.

2. The nondestructive test system of claim 1 wherein said housing additionally includes variably positioned stop means for limiting radially outward movement of both of said counterweights thereby limiting radially inward movement of said search heads.

3. The nondestructive test system of claim 2 wherein said variably positioned stop means comprises a cam rotatably mounted on said housing, means for releasably locking said cam relative to said housing, a pair of cam stop surfaces, and a cam follower carried by each of said counterweights for engagement with said can stop surfaces.

4. The nondestructive test system of claim 1 additionally including means for rotating said housing relative to said workpiece for producing the centrifugal forces on said counterweights.

5. The nondestructive test system of claim 1 wherein said search heads comprise eddy current sensing probes.

6. The nondestructive test system of claim 5 additionally including a rotary transformer mounted on said housing and coupled to said eddy current sensing probes.

* * * * *